United States Patent [19]

Brumm

[11] 4,313,461
[45] Feb. 2, 1982

[54] PILOT PRESSURE INTENSIFIER

[75] Inventor: Richard S. Brumm, Orinda, Calif.

[73] Assignee: Grove Valve and Regulator Company, Oakland, Calif.

[21] Appl. No.: 172,403

[22] Filed: Jul. 25, 1980

[51] Int. Cl.³ .............................................. F16K 31/38
[52] U.S. Cl. ....................................... 137/489; 251/57
[58] Field of Search ............................ 137/489; 251/57

[56] References Cited

U.S. PATENT DOCUMENTS

| | | | |
|---|---|---|---|
| 3,182,971 | 5/1965 | Wakeman | 251/57 X |
| 3,669,142 | 6/1972 | Gerbic | 137/489 |
| 4,026,513 | 5/1977 | Callenberg | 137/489 X |
| 4,043,533 | 8/1977 | Cowley | 251/57 |

*Primary Examiner*—Alan Cohan
*Attorney, Agent, or Firm*—Melvin R. Stidham

[57] ABSTRACT

A pressure intensifying system for low differential service particularly adapted for use in a gas transmission system which is conditioned to operate in response to pressure differentials. For example, where a pilot valve normally delivers a gas at regulated pressure to the jacket of an expansible tube main valve, the gas is here asserted against a diaphragm in the first of two cylinders in tandem. The diaphragm works against a spring to drive a piston in a smaller diameter, hydraulic cylinder, which delivers the liquid at pressures so intensified to the expansible tube valve jacket. When pressures are relatively high, the intensified liquid pressure ensures a seal, even at low differentials. Conversely, at low pressures which cannot overcome the spring, as when the jacket is being dumped, the piston is fully retracted and the hydraulic cylinder is vented to atmosphere. Hence, at low pressures only atmospheric pressure is asserted in the jacket.

4 Claims, 1 Drawing Figure

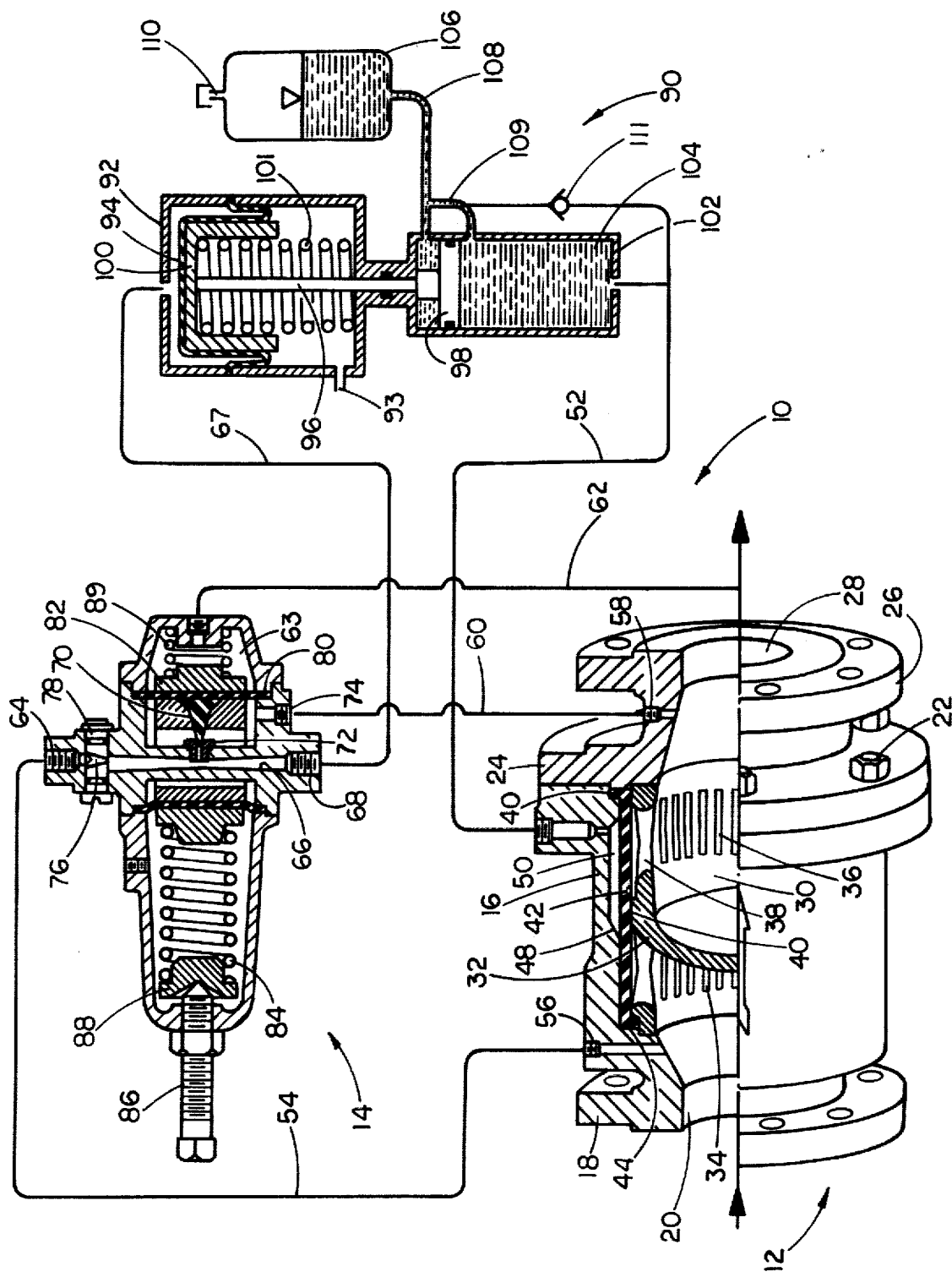

PILOT PRESSURE INTENSIFIER

BACKGROUND OF THE INVENTION

Normally, the force acting to open the tube of an expansible tube valve comes from the differential between the upstream and downstream pressures. Should this differential become low, as when the demand for flow is high, it may be insufficient to open the tube fully against the elastic forces of the tube. Hence, at the time when full expansion of the tube is most needed, the forces available to produce the expansion are at a minimum.

In Gerbic U.S. Pat. No. 3, 669,142 this problem is dealt with in two ways. First, it proposes discharging the jacket to a region immediately downstream of the valve barrier, where static pressure is lower than elsewhere downstream, thus providing an added margin of differential to facilitate expansion of the tube. However, even this added differential may not always be sufficient to open the tube fully. Second, Gerbic proposes discharging the pilot to the atmosphere, but, where natural gas is the medium, this can only be done where atmospheric leak is safe and acceptable from an environmental standpoint.

OBJECTS OF THE INVENTION

It is an object of this invention to provide a device for maximizing the pressure differential for opening an expansible tube valve without contaminating the atmosphere.

It is a further object of this invention to increase the jacket pressure of an expansible tube valve when sealing.

Other objects and advantages of this invention will become apparent from the description to follow, particularly when read in conjunction with the accompanying drawing.

SUMMARY OF THE INVENTION

In carrying out this invention there are provided gas and hydraulic cylinders aligned in tandem with the gas cylinder being of greater diameter. A diaphragm sealed across the gas cylinder drives a piston in the hydraulic cylinder and the output of the hydraulic cylinder is delivered to the jacket of the expansible tube valve. A spring opposes the diaphragm, so that at low pressures there is no diaphragm movement and the jacket is at the atmospheric pressure of the hydraulic reservoir.

BRIEF DESCRIPTION OF THE DRAWING

The drawing is a schematic view of the pressure intensifier of this invention including partial section views of an expansible tube valve and pilot valve.

DESCRIPTION OF A PREFERRED EMBODIMENT

Referring now to FIG. 1 with greater particularity, there is shown a pressure regulating system 10 including an expansible tube type pressure regulator 12 and a pressure control or pilot valve 14. The pressure regulator valve 12 has a generally cylindrical housing 16, including an upstream hub 18 provided with a central flow passage 20. Secured onto the downstream end of the housing 16, as by means of bolts 22, is a closure member 24 carrying the downstream hub 26 and having an outlet flow passage 28 therethrough. A core sleeve 30 is positioned within the housing 16 and includes a dam or barrier 32 that extends completely across the inside thereof to prevent axial flow of fluid through it. However, flow around the dam 32 is enabled through spaced series of inlet and outlet slots 34 and 36 between ribs 38. The ribs 38 and an outer cylindrical sealing surface 40 of the barrier 32 are normally snugly embraced by an expansible tube or sleeve 42, which is stretched around them. The expansible tube 42 has an in-turned flange 44 at the upstream end that is clamped and sealed between the core sleeve 30 and the body 16 and an out-turned flange 46 at the downstream end that is clamped between the body 16 and the downstream closure member 24.

The inner surface of the regulator body 14 is tapered outward at 48 to form a control chamber or jacket 50 to which a control pressure fluid may be delivered from the pilot valve 14 through a duct 52, as will hereinafter be described.

In the regulator system 10 illustrated, the jacket or control pressure is tapped through an upstream pilot gas load line 54, which is connected to a fitting 56 opening into the upstream flow passage 20. A similar fitting 58 is provided in a downstream flow passage 28 whereby the pressure loading gas may be evacuated to relieve the jacket 50. The gas flowing back through the pilot valve 14 and out through a dumping duct 60, which opens into a low pressure zone in a downstream flow passage 28 of the regulator vlave 12. The pressure being monitored and controlled is conveniently tapped from a suitable location in the downstream pipeline (not shown) through a duct 62 to the sensing chamber 63 of the pilot valve 14.

The gas inlet or load duct 54 is connected to the inlet port 64 of a through conduit 66 which extends completely across the pilot valve 14, and the delivery section 67 of the gas load duct is connected at the other end port 68. Evacuation of the load duct outlet section 67 to the dumping duct 60 is achieved when a valve closure member 70 of the poppet type is moved away from a valve port 72 which opens laterally from the through conduit 66 intermediate the opposite end ports 64 and 68, the fluid flowing from the pilot valve through a port fitting 74 to which the dumping duct 60 is connected.

A variable orifice 76, which is formed in a rotatable plug 78 extending across the through flow passageway 66, restricts flow into the through passageway from the upstream tap 56, 64 while the outlet section 67 of the load duct is being evacuated through the ports 68, 72 and 74.

Where, as shown, it is the downstream fluid pressure that is being monitored, it is introduced from the sensing line 62 into the sensing chamber 63 in the pilot valve 14 to act against one side of a diaphragm 80 which is sealed across a sensing chamber 63. The diaphragm 80 is secured on a carrier member 82, and the action of the monitored fluid in the sensing chamber 63 is opposed by a relatively strong spring 84 acting between the carrier 82 and a spring cap 88, which may be moved in either direction by an adjustment screw 86 in order to adjust the spring compression. A relatively light spring 89 acts against the bottom of the carrier 82 to insure closing of the the valve 70 at zero sensing pressure.

As a particular feature of this invention, there is provided a pressure intensifier 90 to convert the narrow band gas pressure signal from the pilot valve 14 to a wider band hydraulic pressure signal delivered to the control chamber or jacket 50. Specifically, the hydraulic signal varies from atmospheric to minimize resistance to opening of the flexible tube 42 to something well in excess of upstream pressure, to insure tight shut-off of the main valve 12.

The pressure intensifier is interposed between the gas load line 67 and a liquid load line 52 with the gas output from the pilot valve being delivered from port 68 through line 67 to a first vessel 92, with a first pressure-responsive member e.g. a diaphragm, 94 sealed across it, the volume below being vented at 93. A motion-transmitting piston rod 96 carrying a piston 98 is secured to the diaphragm carrier 100 to move therewith, movement of the diaphragm being opposed by a spring 101. The piston 98 is reciprocable in a hydraulic cylinder 102 which is of substantially smaller cross section or diameter then the first or gas vessel 92.

A suitable liquid 104, such as an oil from a reservoir 106, fills the cylinder 102 through ducts 108, 109, the reservoir being open to atmosphere at 110. Every time the piston 98 is fully retracted, any loss of oil volume that may have occurred in the liquid system, by reason of leakage or temperature change, is replenished through line 109 and/or through check valve 111 to liquid load line 52. When the vent 109 is exposed, the hydraulic system is vented to the atmospheric reservoir. Consequently, the jacket 50 is also at atmospheric pressure.

In operation of the device, when the pilot valve 70 is closed, the pressure in line 67 gradually builds up to that of the upstream line pressure 20 through load duct 54 and orifice 76, and this pressure is asserted against the diaphragm 94 to force the piston rod 96 down against the action of the spring 101. This drives the piston 98 down to pressurize the hydraulic fluid 104 in the smaller cylinder 102, which is delivered at the intensified pressure through the hydraulic load line 52 into the chamber 50. Hence, the pressure in the jacket 50 may be considerably greater than the line pressure within the flexible tube 42, insuring a tight seal off when the valve is closed.

If the pressure in sensing line 62 falls off, because of a deterioration of the downstream pressure, the pilot spring 84 will force the valve 70 to open, and drain the gas load line 67 to the level of downstream pressure. At lower levels of operation, this may result in a pressure differential which is insufficient to produce full opening of the flexible sleeve 42. Hence, the spring 101 is provided so that pressures in line 67 must be sufficient to overcome the spring strength before the diaphragm plate is moved. As previously described, in this condition, just the atmospheric pressure of the reservoir 106 is being delivered to the jacket 50. This results in a greater differential with the upstream pressure and increases flow in the valve-open position.

The pilot valve 70 will remain open until the pressure in the sensing chamber 63 is able to overcome the spring 84 and force the valve closure 70 against its seat. Now, gas flowing through the orifice 76 gradually builds up pressure in the gas load line 67 and the gas cylinder 92, increasing the pressure in the jacket 50. In conditions of continuous flow there is a relatively constant pressure differential between the upstream line 20 and the jacket 50, to maintain a flow rate sufficient to hold the desired level of pressure being controlled.

By way of example, suppose the gas cylinder 92 is 1 square inch in cross-sectional area; the hydraulic cylinder is 0.5 square inches in cross-sectional area; the force of spring 101 is 25 lbs.; and the maximum gas pressure output in line 67 is 100 p.s.i.. Then, at gas pressures up to 25 p.s.i. the hydraulic output in line 52 and jacket 50 is 0 p.s.i., giving an extra margin for opening. Then, from 50 p.s.i. to 100 p.s.i., the hydraulic output increases from 50 p.s.i. to 150 p.s.i., giving an extra sealing margin.

While this invention has been described in conjunction with a preferred embodiment thereof, it is obvious that modifications and changes therein may be made by those skilled in the art to which it relates, without departing from the spirit and scope of this invention, as defined by the claims appended hereto.

What is claimed as invention is:

1. For use with a main valve member, including a flexible control member exposed on one side to upstream line pressure biasing said main valve member open, and on the other side by fluid pressure in a control chamber,
   a load line to said control chamber connected to the upstream side of said main valve member;
   an orifice in said load line;
   a pilot exhaust port in said load line downstream of said orifice;
   a pilot valve body with a valve closure member engagable with said exhaust port;
   means for opening said valve closure member at predetermined pipeline conditions; and
   an exhaust duct for connecting said exhaust port to the downstream side of said main valve member;
   the improvement comprising:
   a pressure intensifier interposed in said load line downstream of said exhaust port and including:
   first and second vessels connected to the outlet of said load line and to said main valve control chamber, respesctively;
   said first vessel being larger in cross-section than said second vessel;
   first and second pressure responsive members sealed across said first and second vessels;
   a liquid contained in said second vessel on the delivery side of said second pressure-responsive member;
   said pressure-responsive members being mechanically connected so that a pressure applied to said first pressure-responsive member to produce movement thereof moves said second pressure-responsive member to deliver liquid at intensified pressure to said jacket;
   a reservoir open to atmosphere and containing said liquid;
   a liquid supply line from said reservoir to said second vessel away from the delivery end thereof to be uncovered by said second pressure-responsive member when retracted; and
   biasing means in said first vessel acting against said first pressure-responsive member in opposition to fluid pressure so that only atmospheric pressure is delivered by said second pressure-responsive member until said biasing means is overcome to cover said liquid supply line, and thereafter pressure in excess of said biasing means is multiplied in accordance with the ratio of vessel cross-sectional areas.

2. The improvement defined by claim 1 wherein:
   said second vessel is a cylinder and said second pressure-responsive member is a piston.

3. The combination defined by claim 1 wherein:
   said first pressure-responsive member in a flexible diaphragm sealed across said first vessel.

4. The combination defined by claim 2 including:
   a relief line from said reservoir to the end of said second vessel so as to be continuously open thereto behind said piston.

* * * * *